(12) United States Patent
Chen

(10) Patent No.: US 11,146,525 B2
(45) Date of Patent: *Oct. 12, 2021

(54) METHOD FOR PRESETTING INSTANT MESSAGING ACCOUNT CONTRACTS AND PRESETTING ADDRESS BOOK ACCORDING TO MESSAGING RELATIONSHIP BETWEEN ROLES

(71) Applicant: CHENGDU QIANNIUCAO INFORMATION TECHNOLOGY CO., LTD., Sichuan (CN)

(72) Inventor: Dazhi Chen, Meishan (CN)

(73) Assignee: CHENGDU QIANNIUCAO INFORMATION TECHNOLOGY CO., LTD., Sichuan (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/634,875

(22) PCT Filed: Jul. 28, 2018

(86) PCT No.: PCT/CN2018/097710
§ 371 (c)(1),
(2) Date: Jan. 28, 2020

(87) PCT Pub. No.: WO2019/024831
PCT Pub. Date: Feb. 7, 2019

(65) Prior Publication Data
US 2020/0267111 A1    Aug. 20, 2020

(30) Foreign Application Priority Data

Jul. 29, 2017 (CN) .......................... 201710634812.5

(51) Int. Cl.
*H04L 29/06* (2006.01)
*H04L 29/08* (2006.01)
(Continued)

(52) U.S. Cl.
CPC ............ *H04L 51/28* (2013.01); *H04L 51/046* (2013.01); *H04L 51/22* (2013.01)

(58) Field of Classification Search
CPC ....... H04L 51/28; H04L 51/046; H04L 51/22; H04L 51/04; H04L 51/36; H04L 51/32; H04M 1/27457; H04M 1/27453
(Continued)

(56) References Cited

U.S. PATENT DOCUMENTS 7,676,542 B2 *  3/2010  Moser ................. G06Q 10/107
                                                  709/204
7,904,511 B2 *  3/2011  Ryan .................. G06Q 10/1053
                                                  709/204
(Continued)

FOREIGN PATENT DOCUMENTS

CN    103475712 A    12/2013
CN    104363163 A    2/2015
(Continued)

OTHER PUBLICATIONS

A Flexible Role-based Secure Messaging Service: Exploiting IBE Technology for Privacy in Health Care Proceedings of the 14th International Workshop on Database and Expert Systems Applications (DEXA'03) Oct. 28, 2020 at 17:08:41 UTC from IEEE Xplore. (Year: 2008).*

(Continued)

*Primary Examiner* — David R Lazaro
*Assistant Examiner* — Berhanu Shitayewoldetadik
(74) *Attorney, Agent, or Firm* — Ladas & Parry, LLP

(57) ABSTRACT

A method for presetting contacts of an instant messaging account and presetting an address book according to a messaging relationship between roles is provided. The method includes creating roles in a system, and during the same period, one role can only be related to a unique user, (Continued)

Create roles in a system, where one role can only be related to a unique user during the same period, and one user is related to one or more roles; one user corresponds to one employee, and one employee corresponds to one user

↓

Establish a relation between a user/an employee and an instant messaging account, where one user/employee is related to one instant messaging account, and one instant messaging account is related to one user/employee

↓

Set a messaging relationship between a messaging role and a messaged role according to work content of the roles in the system, and set one or more messaged roles for each messaging role that needs to set a messaging relationship while one user is related to one or more roles; one user corresponds to one employee, and one employee corresponds to one user; establishing a relation between a user/an employee and an instant messaging account, wherein one user/employee is related to one instant messaging account, and one instant messaging account is related to one user/employee; and setting a messaging relationship between a messaging role and a messaged role according to the work content of the roles in the system.

10 Claims, 7 Drawing Sheets

(51) Int. Cl.
G06F 15/16 (2006.01)
H04L 12/58 (2006.01)
(58) Field of Classification Search
USPC .......................................................... 709/206
See application file for complete search history.

(56) References Cited

U.S. PATENT DOCUMENTS

| | | | | |
|---|---|---|---|---|
| 8,745,087 B2* | 6/2014 | Daily | ................. | G06F 21/6218 707/781 |
| 9,798,813 B2* | 10/2017 | Walters | ................. | G06Q 30/016 |
| 10,032,039 B1* | 7/2018 | Milman | ............... | G06F 21/6218 |
| 10,262,149 B2* | 4/2019 | Milman | ................. | H04L 51/22 |
| 2004/0107249 A1* | 6/2004 | Moser | ................. | G06Q 10/107 709/204 |
| 2004/0172279 A1* | 9/2004 | Carolan | ............... | G06Q 20/384 705/39 |
| 2004/0248597 A1* | 12/2004 | Mathis | ................. | H04L 51/043 455/466 |
| 2006/0031322 A1* | 2/2006 | Kessen | ................... | H04L 51/04 709/206 |
| 2006/0173960 A1* | 8/2006 | Zlateff | ................ | H04L 67/1048 709/206 |
| 2009/0024741 A1* | 1/2009 | Roach | ..................... | H04L 41/00 709/225 |
| 2009/0043843 A1* | 2/2009 | Milewski | ................ | H04L 51/04 709/204 |
| 2009/0089291 A1* | 4/2009 | Daily | ..................... | G06Q 10/10 |
| 2009/0150386 A1* | 6/2009 | Lichtblau | ............... | G06Q 30/08 |
| 2009/0327882 A1* | 12/2009 | Velusamy | ........... | H04L 12/1818 715/269 |
| 2010/0008352 A1* | 1/2010 | Przybysz | ............... | H04L 67/147 370/352 |
| 2010/0042600 A1* | 2/2010 | Orr | .................... | G06Q 10/0631 705/7.12 |
| 2010/0221693 A1* | 9/2010 | Gupta | ...................... | G09B 5/14 434/362 |
| 2010/0274815 A1* | 10/2010 | Vanasco | ............... | G06Q 10/107 707/798 |
| 2011/0099612 A1* | 4/2011 | Lee | ......................... | H04L 51/04 726/6 |
| 2011/0112976 A1* | 5/2011 | Ryan | ....................... | H04L 63/08 705/319 |
| 2011/0161791 A1* | 6/2011 | Travis | .................... | G06Q 10/10 715/205 |
| 2011/0289010 A1* | 11/2011 | Rankin, Jr. | ............ | G06Q 50/16 705/313 |
| 2011/0289161 A1* | 11/2011 | Rankin, Jr. | ........... | G06Q 10/107 709/206 |
| 2011/0289428 A1* | 11/2011 | Yuen | ........................ | H04L 51/04 715/752 |
| 2013/0290426 A1* | 10/2013 | Sorensen | ................ | H04L 51/32 709/204 |
| 2013/0332540 A1* | 12/2013 | Vadhavkar | .............. | H04L 51/04 709/206 |
| 2014/0108084 A1* | 4/2014 | Bargetzi | ................. | H04L 63/105 705/7.19 |
| 2014/0324983 A1* | 10/2014 | Burns | ..................... | H04L 51/04 709/206 |
| 2015/0026187 A1* | 1/2015 | Ballou | ................. | G06F 16/2228 707/741 |
| 2015/0242514 A1* | 8/2015 | Simon | .................... | G06Q 50/01 715/739 |
| 2015/0256557 A1* | 9/2015 | Wong | .................... | H04L 67/306 726/6 |
| 2016/0277341 A1* | 9/2016 | Garen | ................. | G06F 3/04847 |
| 2017/0126689 A1* | 5/2017 | Lloyd | ................. | H04L 61/1594 |
| 2017/0149706 A1* | 5/2017 | Amble | .................. | H04L 67/306 |
| 2017/0155608 A1* | 6/2017 | Garen | ................. | G06F 3/04847 |
| 2018/0032960 A1* | 2/2018 | Pannagl, Jr. | ........ | G06Q 10/1053 |
| 2018/0114601 A1* | 4/2018 | Ou | .......................... | G16H 40/67 |
| 2018/0365439 A1* | 12/2018 | Milman | .................. | H04L 51/02 |
| 2019/0132932 A1* | 5/2019 | Klecha | .................. | H05B 47/19 |
| 2019/0334917 A1* | 10/2019 | Demmler | .............. | H04L 63/104 |
| 2019/0362290 A1* | 11/2019 | Rogynskyy | ........... | G06F 16/337 |
| 2020/0036687 A1* | 1/2020 | May | .................... | G06F 21/6245 |
| 2020/0177597 A1* | 6/2020 | Kabesa | ............... | H04L 63/0876 |

FOREIGN PATENT DOCUMENTS

| | | |
|---|---|---|
| CN | 107302540 A | 10/2017 |
| CN | 107360083 A | 11/2017 |
| WO | WO-2005067253 A1 * | 7/2005 ............. H04L 51/38 |

OTHER PUBLICATIONS

"Context-Dependent Access Control for Contextual Information" Second International Conference on Availability, Reliability and Security (ARES'07) IEEE. (Year: 2007).*
"Evolving Messaging Systems for Secure Role Based Messaging" Proceedings of the 10th IEEE International Conference on Engineering of Complex Computer Systems (ICECCS'05) (Year: 2005).*
"A tool for role-based chatting" Publisher IEEE. International conference on systems, Man and Cybernetics. (Year: 2007).*
International Search Report of the international application No. PCT/CN2018/097710, dated Oct. 8, 2018.
Written Opinion of the international application No. PCT/CN2018/097710, dated Oct. 8, 2018.
First Office Action and search report from CN app. No. 201810850483.2, with English translation from Global Dossier.

* cited by examiner

METHOD FOR PRESETTING INSTANT MESSAGING ACCOUNT CONTRACTS AND PRESETTING ADDRESS BOOK ACCORDING TO MESSAGING RELATIONSHIP BETWEEN ROLES

CROSS-REFERENCE TO RELATED APPLICATIONS

This application is the U.S. national phase of PCT/CN2018/097710, filed on Jul. 28, 2018, which claims priority to Chinese Application No, 201710634812.5 filed on Jul. 29, 2017, the disclosures of which are incorporated by reference herein in their entireties.

BACKGROUND

Technical Field

The present invention relates to a method for setting instant messaging accounts and an employee address book in a management system such as ERP or CRM, and in particular, to a method for presetting contacts of an instant messaging account and a method for presetting an address book according to a messaging relationship between roles.

Related Art

Role-based access control (RBAC) is one of the most researched and mature permission management mechanisms for databases in recent years. It is considered to be an ideal candidate to replace conventional mandatory access control (MAC) and discretionary access control (DAC). Conventional discretionary access control has high flexibility but low security. Mandatory access control is highly secure but too restrictive. Role-based access control combines both above, and not only is easy to manage, but also reduces complexity, costs, and probability of errors. Therefore, it has been greatly developed in recent years. The basic idea of role-based access control (RBAC) is to divide different roles according to different functional positions in the enterprise organization view, encapsulate the access permission of database resources in roles, and allow users to indirectly access database resources by assigning different roles to the users.

A large number of tables and views are often built in large-scale application systems, which makes the management and permissions of database resources very complicated. It is very difficult for a user to directly manage the access and permissions of the database resources. It requires the user to have a very thorough understanding of the database structure and to be familiar with the use of the SQL language. Once the application system structure or security requirements have changed, a large number of complex and cumbersome permission changes are required, and the security vulnerabilities caused by unexpected authorization errors are very likely to occur. Therefore, designing a simple and efficient permission management method for large-scale application systems has become a common requirement for systems and system users.

The role-based permission control mechanism can manage the access permissions of the system simply and efficiently, which greatly reduces the burden and cost of the permission management of the system, and makes the permission management of the system more compliant with the business management specifications of the application system.

However, the conventional role-based user permission management method adopts the "role-to-user, one-to-many" relation mechanism, where the "role" has the nature of a group/a class. That is, one role can simultaneously correspond to or be related to multiple users, and the role is similar to a post/a position/a type of work or other concepts. The permission authorization to a user under this relation mechanism is basically divided into the following three forms: 1. As shown in FIG. 1, the permission is directly authorized to the user, where the disadvantage is that the workload is large and the operation is frequent and cumbersome. When changes on an employee have occurred (such as transfer or resignation), all permissions related to the employee shall be adjusted accordingly. Especially, for administrators in a company, many permissions are involved. As the permission adjustment involves large workloads and is cumbersome, errors or omissions are likely to occur, affecting the normal operation of the enterprise and even causing unpredictable losses.

2. As shown in FIG. 2, the role (having the nature of a class/a group/a post/a type of work) is authorized (one role may be related to multiple users), the user obtains permissions through its role, and the approval operator is the role that has the nature of a group/a class. 3. As shown in FIG. 3, the above two forms are combined.

In the above descriptions, as both form 2 and form 3 need to authorize the role that has the nature of a class/a group. The way of authorization through the role having the nature of a class/a group/a post/a type of work has the following disadvantages: 1. Operations are difficult when the user's permission has changed. In the actual process of using a system, the user's permissions often need to be adjusted during the operation process. For example, in processing the change of employee's permissions, when the permissions of an employee related to the role have changed, it is improper to change the permissions of the entire role due to the change of the permissions of the individual employee, because this role is also related to other employees whose permissions remain unchanged. Therefore, to deal with this situation, either a new role is created to fit the employee whose permissions have changed, or permissions are directly authorized to the employee (disengaged from the role) based on permission requirements. The above two processing methods not only take a long time but also cause mistakes easily for the role authorization in the case of a large number of role permissions. It is cumbersome for a user to operate, and errors occur easily, resulting in loss to the system user.

When the form operation permissions of the employee/user have changed, either the employee/user is disengaged from the role, or a new role is added to meet the requirements of work. The defect of the first way is the same as that of the foregoing method of "direct authorization to the user". In the second way, adding a new role involves the creation, relation, and authorization of the role. Especially when there are many roles and many users related to the roles, it is difficult to remember which users are specifically related to the role.

2. It is difficult to remember the specific permissions contained in a role for a long time. If the role has many permission function points, as time goes by, it is difficult to remember the specific permissions of the role, and it is even more difficult to remember the permission differences between roles with similar permissions. The permissions of similar roles are also easily confusable. If a new user needs to be related, it is impracticable to accurately determine how to select a relation.

3. Because user permissions change, more roles will be created (if new roles are not created, direct authorization to the user will be increased greatly), and it is more difficult to distinguish specific differences between permissions of the roles.

4. When a user is transferred from a post, if many permissions of the transferred user need to be assigned to other users, it is necessary to distinguish the permissions of the transferred user and create roles to be related to the other users respectively during the processing. Such operations are not only complicated and time-consuming, but also prone to errors.

Instant messaging is an important tool for internal and external communication in various enterprises and institutions. Instant messaging software commonly used at present includes QQ, WeChat, MSN, Fetion, and the like. The address book also plays the most fundamental role in a management system. In the conventional enterprise management mode, an instant messaging account, such as a QQ number, can only be directly assigned to a person or a user, and the following problems are caused in the using process:

A. If an employee works for multiple posts in the enterprise, effective work handover cannot be achieved when the employee resigns or is transferred. For example, Zhang San serves as a sales engineer in a sales department I of a building material business department, and also a sales engineer in a sales department I of an aircraft business department. Now Zhang San is going to leave the post of the sales engineer in the sales department I of the aircraft business department, and Li Si takes over this post. However, Zhang San's QQ account cannot be directly handed over to Li Si, because Zhang San still needs to contact and follow up many building material-related customers in his/her QQ account. Li Si has to use a new QQ account to add aircraft-related customers. In this case, it easily makes a bad impression on the customers on one hand, and on the other hand, Li Si does not know previous communication situations (message records) between Zhang San and the aircraft-related customers either. Moreover, the aircraft-related customers are likely to continue contacting Zhang San, which easily leaks confidential information of the aircraft-related customers.

B. If Zhang San resigns and Li Si takes over Zhang San's QQ account, Li Si will be able to see QQ message records and new messages of the building material-related customers (Li Si only takes over the sales work, of only the aircraft business department), which easily leaks confidential information of the building material-related customers. Similarly, a person who only takes over the sales work of the building material business department cannot take over the Zhang San's QQ account either, because the person will see QQ message records and new messages of the aircraft-related customers after taking over the Zhang San's QQ account.

C. Because a QQ account is directly assigned to an individual but is not permanently bound to a fixed individual or a user fixedly, and is assigned to an employee for use through a manual operation, confidential information of the enterprise is easily leaked in the assignment process (manually assigning a QQ account to an employee has an obvious disadvantage: in repeated assignment processes over a long time, it occurs easily that after the QQ account is assigned to the employee, respective working ranges corresponding to the employee and the QQ account are greatly deviated, or even there may be an error occurring therebetween, but the QQ has been still put into use or even has been in use for a relatively long time or a very long time, which causes great inconvenience and troubles as well as immeasurable losses to subsequent work). For example, a QQ account is initially assigned to a salesperson Zhang San for use (Zhang San is responsible for the sales in the building material industry). Later, Zhang San gives up this QQ account due to resignation or other reasons, and this QQ account is further assigned to a salesperson Li Si for use (Li Si is responsible for the sales in the aircraft industry). After Li Si stops using the QQ account, it is further assigned to a salesperson Wang Wu responsible for the software industry, and so on. Therefore, messages sent and received by this QQ account may involve customers in all the industries of the company. However, the company divides market ranges of the salespersons based on the industries, and a salesperson is not allowed to obtain any information about the market in an area that he/she is not responsible for. The problem above is serious enough. However, more seriously, if customers in an industry that the salesperson is not responsible for contact the salesperson through the QQ account previously, and may keep sending subsequent messages to the QQ account later. In this case, the subsequent messages will also be continuously known by the salesperson who should not have known these messages. The situation could be even worse. If a QQ account that has been used by financial personnel or a QQ account that has been used by research and development personnel are related to a salesperson after being related many times, the confidential information on research and development or confidential financial information will be known by the currently related salesperson, which easily leads to the leakage of sensitive information and may cause severe losses to the company.

D. When an employee is recruited or transferred from a post, an instant messaging account needs to be related to the employee each time, which involves large workloads. Moreover, re-relating the instant messaging account to the employee may be delayed in some degree, which affects the normal operation of related work. For example, when an employee A has been transferred from a position as a production supervisor to a position as a sales supervisor, if no new instant messaging account is related to the employee A after the current instant messaging account of the employee A is handed over to his/her successor, the employee A cannot carry out any related work for the lack of an instant message account currently. If the current instant messaging account of the employee A is not handed over to his/her successor, the successor will not know previous business-related communication information, which is adverse to carrying out the work. For another example, the employee A who has held two posts: the production supervisor and the after-sales supervisor are now no longer in the post of the production supervisor (the employee A's instant messaging account cannot be given to the successor, because it also contains the communication information related to the work of the after-sales supervisor). If a new instant messaging account is assigned to the successor of the production supervisor, it is also necessary to notify messaging contacts one by one (for example, equipment maintenance personnel and outsourcing manufacturers), which not only involves large workloads but also imposes extra work to the messaging contacts. Moreover, the employee A may still receive subsequent production-related messages (for example, an information sender does not know that the employee A is no longer in the post of the production supervisor). For another example, when the employee A is transferred from the position as the production supervisor to the position as the sales supervisor, if no new instant messaging account is assigned to the employee A immediately after the current instant messaging account of the employee A is handed over to his/her successor, the employee A cannot handle the work through the instant messaging account during this period, which is adverse to the normal operation of the work.

In addition, in the conventional system, the employee obtains the contacts of instant messaging account mainly by the following two ways: (1) The employee adds contacts for which a relation needs to be established one by one according to work requirements, and needs an agreement from the opposing party. In many cases, one employee needs to communicate with many contacts about the work, but this method brings tremendous workloads to the employee and affects the working efficiency.

(2) The system sets instant messaging accounts of all employees as contacts of each other. For example, when needing to contact a financial supervisor to deal with a reimbursement affair, an employee Zhang San has to find the financial supervisor from numerous contacts and then carry out communication. The searching process is less effective and is troublesome. Although groups may be set for an instant messaging application to solve the problem of the low efficiency of finding the contacts, disturbance is inevitable because there are too many contacts irrelevant to the work content.

An address book of a conventional system usually includes communication information of all the employees in the company, for example, names, phone numbers, QQ accounts, and mailboxes, which also has the problems of low searching efficiency and being easily disturbed. The conventional method cannot achieve refined dynamic management of the address book.

SUMMARY

Technical Problems

One object of the present invention is to provide a method for presetting contacts of an instant messaging account according to a messaging relationship between roles. A messaging relationship between roles is set according to the work content of the roles in the system, and contacts related to an employee's work are preset for an instant messaging account related to the employee, so that the employee can achieve quick and effective communication through the instant messaging account.

Another object of the present invention is to provide a method for presetting, an address book according to a messaging relationship between roles. A messaging relationship between roles is set according to the work content of the roles in the system, and an address book composed of communication information of employees related to an employee's work is preset for the employee, so that the employee can quickly find, through the address book, communication information of an employee to be contacted.

Solutions to Problems

Technical Solutions

The objects of the present invention are achieved by the following technical solutions: A method for presetting contacts of an instant messaging account according to a messaging relationship between roles includes the following steps:

(1) creating roles in a system, where said role is an independent individual not a group/a class, and during the same period, one role can only be related to a unique user, and one user is related to one or more roles; one user corresponds to one employee, and one employee corresponds to one user;

(2) establishing a relation between a user/an employee and an instant messaging account, where one user/employee is related to one instant messaging account, and one instant messaging account is related to one user/employee; and (3) setting a messaging relationship between a messaging role and a messaged role according to the work content of the roles in the system, wherein said messaging role and said messaged role are both the roles in the system; and setting one or more messaged roles for each messaging role for which a messaging relationship needs to be set, so that a messaging relationship is established between an instant messaging account related to a user who is related to the messaging role or an employee corresponding to the user and an instant messaging account related to a user who is related to the messaged role or an employee corresponding to the user, and the instant messaging account related to the user who is related to the messaged role or the employee corresponding to the user is used as a contact of the instant messaging account related to the user who is related to the messaging role or the employee corresponding to the user.

Step (1), step (2), and step (3) are performed sequentially; or step (1), step (3), and step (2) are performed sequentially; or step (2), step (1), and step (3) are performed sequentially.

When the original messaged role is selected as a messaging role to set contacts of the instant messaging account, the original messaging role becomes its messaged role, and in this case, the instant messaging account related to the user who is related to the original messaging role or the employee corresponding to the user cannot be deleted from contacts of the instant messaging account related to the user who is related to the original messaged role or the employee corresponding to the user, and if deletion is needed, the instant messaging account can only be deleted when the contacts of the instant messaging account of the original messaging role are set.

After an instant messaging account is related to a user/an employee, the instant messaging account related to the user/employee cannot be changed; or after an instant messaging account is related to a user/an employee and the instant messaging account is used, the instant messaging account related to the user/employee cannot be changed.

When an instant messaging account is related to a user, the instant messaging account related to the user is used as an instant messaging account of an employee corresponding to the user; and when an instant messaging account is related to an employee, the instant messaging account related to the employee is used as an instant messaging account of a user corresponding to the employee.

A method for presetting contacts of an instant messaging account according to a messaging relationship between roles includes the following steps: creating roles in a system, wherein said role is an independent individual not a group/a class, and during the same period, one role can only be related to a unique user, while one user is related to one or more roles; establishing a relation between a role and an instant messaging account, wherein one role is related to one instant messaging account, and one instant messaging account is related to one role; and setting a messaging relationship between a messaging role and a messaged role according to the work content of the roles in the system, wherein said messaging role and said messaged role are both the roles in the system; and setting one or more messaged roles for each messaging role for which a messaging relationship needs to be set, so that a messaging relationship is established between an instant messaging account related to the messaging role and an instant messaging account related to the messaged role, and the instant messaging account related to the messaged role is used as a contact of the instant messaging account related to the messaging role.

After an instant messaging account is related to a role, the instant messaging account related to the role cannot be changed; or after an instant messaging account is related to a role and the instant messaging account is used, the instant messaging account related to the role cannot be changed.

When the instant messaging account needs to be changed for a role, the role's relation to the original instant messaging account is canceled and the role is related to a new instant messaging account.

Said instant messaging account is an account of an instant messaging application in the system or an account of instant messaging software provided by a third party.

A method for presetting an address book according to a messaging relationship between roles includes the following steps: creating roles in a system, wherein said role is an independent individual not a group/a class, and during the same period, one role can only be related to a unique user, and one user is related to one or more roles; one user corresponds to one employee, and one employee corresponds to one user; and setting a messaging relationship between a messaging role and a messaged role according to the work content of the roles in the system, wherein said messaging role and said messaged role are both the roles in the system, and setting one or more messaged roles for each messaging role for which a messaging relationship needs to be set, so that a messaging relationship is established between an employee corresponding to a user related to the messaging role and an employee corresponding to a user related to the messaged role, and communication information of the employee corresponding to the user related to the messaged role forms an address book of the employee corresponding to the user related to the messaging role.

When the employee corresponding to the user related to the messaged role corresponds to multiple roles related to the user, the communication information of the employee is not displayed repeatedly in the address book of the employee corresponding to the user related to the messaging role.

Beneficial Effects of the Invention

Beneficial Effects

The present invention has the following beneficial effects:
(1) In the present invention, a messaging relationship between roles is set according to the work content of the roles in the system, and contacts related to an employee's work are preset for an instant messaging account related to the employee, so that the employee can achieve quick and effective communication through the instant messaging account, thus reducing the employee's workloads for adding contacts, and also solving the problem of being easily disturbed due to excessive irrelevant contacts. An address book composed of communication information of employees related to an employee's work is preset for the employee, so that the employee can quickly find, through the address book, communication information of an employee to be contacted.

(2) In the present invention, an instant messaging account is bound to each role, and a corresponding instant messaging account is assigned to an employee while a post number or work is assigned to the employee. It is unnecessary to separately assign the instant messaging account to the employee. The employee obtains the instant messaging account through the role related to the corresponding user. When the employee resigns, a system administrator (or a corresponding administrator) directly cancels the relation between the user corresponding to the employee and the role, and then the resigned employee automatically loses the permission to use the instant messaging account, thus avoiding the risk of leaking confidential information of the enterprise. When the employee is transferred from a post, the system administrator (or the corresponding administrator) directly cancels the employee's relation to the original role, and then relates the employee to a new role, and then the employee can automatically obtain, the instant messaging account corresponding to the new role, thus achieving seamless handover and ensuring that the instant messaging account used by the user is updated in time. No hysteresis or omission occurs during the handover of the messaging account, without affecting the employee to use the messaging account normally, and the risk of leaking confidential information is also avoided.

(3) Example of resignation: An instant messaging account related to a role "production worker 1" is a QQ number 123456, and when a user corresponding to an employee Zhang San is related to the "production worker 1", Zhang San uses the QQ number 123456. When Zhang San resigns, a system administrator (or a corresponding administrator) directly cancels the relation between the user corresponding to Zhang San and the role "production worker 1", and then Zhang San automatically loses the permission to use the QQ number 123456, thus preventing the related confidential information of the "production worker 1" from being leaked to Zhang San due to the delay of the QQ number handover. When a newly recruited employee Li Si takes over Zhang San's work, the user corresponding to Li Si is directly related to the "production worker 1". Then, Li Si automatically obtains the permission to use the QQ number 123456 corresponding to the role "production worker 1", and it is unnecessary to assign a new QQ number to Li Si. The operation is simple and convenient, thus greatly reducing the workloads. Moreover, Li Si, who takes over the work, can view Zhang San's, previous message records with contacts in the QQ number, thus achieving a good handover effect, which helps to carry out the work and makes usage convenient.

Example of transfer: The employee Zhang San needs to be transferred from a production department to an after-sales department; the system administrator (or the corresponding administrator) cancels the relation, between the user corresponding to Zhang San and the original role "production worker 1", and then relates the user to a new role "after-sales, personnel 3" in the after-sales department. Then, Zhang San automatically obtains the permission to use a QQ number 987654 corresponding to the role "after-sales personnel 3".

(3) After an employee is transferred from a post or resigns, when the instant messaging account related to the role is assigned to another employee, the instant messaging account will not be assigned to an employee who is not responsible for the work content of the role. Because the role in the present invention is a role having the nature of a post number/a station number, this ensures that communication messages will not be leaked to irrelevant personnel in a process of changing the user of the instant messaging account.

For example, a user corresponding to an employee A is related to two roles: an electrical appliance salesperson 1 and a software salesperson 1. As the employee A resigns, the electrical appliance salesperson 1 is related to a user corresponding to an employee B (the employee B obtains an instant messaging account related to the electrical appliance salesperson 1), and the software salesperson 1 is related to a user corresponding to an employee C (the employee C obtains an instant messaging account related to the software salesperson 1). In this case, the employee B can only obtain information related to electrical appliance sales through a messaging account corresponding to the "electrical appliance salesperson 1", but cannot access information related to software sales. Similarly, the employee C can only obtain information related to software sales through the messaging account corresponding to the "software salesperson 1", but cannot access information related to electrical appliance sales.

(4) In the present invention, an instant messaging account is related to a role according to the work content. When sending a message, a contact of the messaging account does not need to worry that the message content is visible to irrelevant personnel, because the current user of the instant messaging account is definitely responsible for the related work now. For example, the work content of a role A is to conduct attendance statistics, and the role A is related to an instant messaging account X. In this case, after the role A is related to a user corresponding to an employee A, the employee A becomes the current user of the instant messaging account X, while the current work content of the employee A definitely includes conducting attendance statistics. After a contact of the instant messaging account X sends an attendance-related message to the instant messaging account X, the attendance-related message will be invisible to any irrelevant personnel.

(5) After an instant messaging account is related to a role, the instant messaging account related to the role cannot be changed (the role is bound to the instant messaging account permanently, and the binding to the instant messaging account cannot be released even if the role is no longer used), so that all messages related to the work content of the role are collected in the messaging account, and it is unnecessary to worry that the instant messaging account is changed halfway.

For example, if the role A is related to the instant messaging account X, the role A can no longer be related to other instant messaging accounts, and the instant messaging account X can no longer be related to other roles either.

The present application can achieve refiled dynamic management for the address book. In the conventional management system, even if an address book is set manually, its implementation is also limited based on the functional restriction of the conventional software. When employees change dynamically, the original address book will not change dynamically, which cannot satisfy the refined management of the enterprise. For example, the enterprise does not want contact information of employees in a confidential research and development department or contact information of some employees to appear in an address book of employees in a sales department in the management system. Zhang San originally works in the confidential research and development department and there are communication means of other research and development department personnel on Zhang San's address book in the system. After a period of time, Zhang San is transferred to do the sales work in the sales department. In the conventional method, Zhang San still can see the contact information of the original employees in the research and development department on the system address book (even though it can be set manually to disallow Zhang San to see the communication means/information of the colleagues in the confidential research and development department, manual setting is easily delayed). In the present application, while Zhang San takes over the sales work (Zhang San has not worked for the confidential research and development department), Zhang San will automatically obtain the communication means of the related messaged objects through the sales role related to his/her user. In the new address book, the communication means of the employees in the confidential research and development department automatically disappear (the relation between the user corresponding to Zhang San and the role in the confidential research and development department is canceled), and information such as communication contacts and their contact means required for the sales work can be obtained automatically (the user corresponding to Zhang San is related to a role in the sales department). Moreover, when the user related to the messaged role (or messaging role) or the employee corresponding to the user has changed, its address book also changes dynamically. When an employee is recruited or transferred from a post, the employee can also automatically obtain, through the role related to his/her user, the communication information of the user/employee corresponding to the corresponding messaged role, wherein the communication information is obtained dynamically/in time after the setting. In addition, the method for presetting the contacts of the instant messaging account in the present application also has a similar effect.

(6) In the present application, the role is in one-to-one relation to the user. During the same period, one role can only be related to a unique user, and one user is related to one or more roles. The advantage thereof is that the permissions can be obtained as long as the user is related to the role (that is, the user obtains the permissions of its related role), and changes of the role's permissions are much fewer than the changes of the user's permissions in a conventional mechanism. As there are few changes of the quantity of roles having the nature of an independent individual (the nature of a post number/a station number), despite large transfer of employee, few changes occur in the post number/station number (even there is no change within a certain period, that is, the role does not change). This greatly simplifies user's permission management and reduces system overheads.

(7) The operations such as dynamic management, recruitment, and transfer are simple, convenient, efficient and highly reliable. The application of recruitment/resignation/transfer in the permission management is simple. When an employee/a user has changed, it is unnecessary to reset permissions. It is only necessary for a user to cancel the relation or be related to the role. For the user who is no longer in the role, the relation to the role is canceled, and the user who takes over the role is related to the role of the post number. The user related to the role automatically obtains the related tasks and the operation permissions of that role, without re-authorizing the role, thus greatly improving the efficiency, security, and reliability of the system setting.

For example, because the user Zhang San is transferred or resigns from a post, Zhang San no longer works as the role of "purchaser 3", and Zhang San then cancels the relation to the "purchaser 3". Meanwhile, Li Si takes over the work as the role of "purchaser 3", and it only needs to relate Li Si to the role, so Li Si automatically obtains the permissions and the instant messaging account of the role "purchaser 3".

(8) The conventional permission management mechanism defines the nature of a group, a type of work, a class or the like as the role. The role is in a one-to-many relation to the user. In the actual process of using a system, the user's permissions often need to be adjusted during the operation process. For example, in processing the change of employee's permissions, when the permissions of an employee related to the role have changed, it is improper to change the permissions of the entire role due to the change of the permissions of the individual employee, because this role is also related to other employees whose permissions remain unchanged. To deal with this situation, either a new role is created to fit the employee whose permissions have chanced, or permissions are directly authorized to the employee (disengaged from the role) based on permission requirements. The above two processing methods not only take a long time but also cause mistakes easily for the role authorization in the case of a large number of role permissions. It is cumbersome for a user to operate, and errors occur easily, resulting in loss to the system user.

However, under the method of the present application, as the role is an independent individual, the object can be achieved by changing the permissions of the role. Although the method in the present application seems to increase the workload during system initialization, by means of copying or the like, the role can be created or authorized more efficiently than the conventional roles having the nature of a group/a class. As it is unnecessary to consider the commonality of the roles having the nature of a group/a class when satisfying the related users, the solutions in the present application make the permission setting clear and explicit. Especially after the system has been used for a period of time (after the permissions of the user/role have changed dynamically), the solutions in the present application can significantly improve the permission management efficiency for the system user in using the system, make the dynamic authorization simpler, more convenient, clearer and more explicit, and improve the efficiency and reliability of the permission setting.

(9) The conventional group/class-based role authorization method is prone to errors. The method provided in the present application significantly reduces the probability of authorization errors, because the method of the present application only needs to consider the role as an independent individual, without considering the commonality of multiple users related to the role having the nature of a group under the conventional method. Even if errors occur in authorization, only the user related to the role is affected. However, in the case of the conventional role having the nature of a group, all users related to the role are affected. Even if errors occur in authorization, the correction method in the present application is simple and takes a short time, while in the case of the conventional role having the nature of a group, the commonality of the permissions of all users related to the role needs to be considered during correcting the errors. The modification is cumbersome, complex, and error-prone when there are many function points, and in many cases, the problem cannot be solved unless a new role is created.

(10) In the conventional group-based role authorization method, if the role has many permission function points, as time goes by, it is difficult to remember the specific permissions of the role, and it is even more difficult to remember the permission differences between roles with similar permissions. If a new user needs to be related, it cannot be accurately determined how to select a relation. In the method of the present application, the role itself has the nature of a post number/a station number, such that the selection can be made easily.

(11) When a user is transferred from a post, if many permissions of the transferred user need to be assigned to other users, in processing, it is necessary to distinguish the permissions of the transferred user and create roles to relate to other users respectively. The operations are complicated, time-consuming, and prone to errors.

The method in the present application is as follows: The transferred user is related to several roles. When the user is transferred, the relation between the user and the roles in the original department is first canceled (the canceled roles may be re-related to other users), and then the user is related to a role in a new department. The operation is simple and not error-prone.

DETAILED DESCRIPTION

Description of Embodiments

The technical solutions of the present invention will be further described in detail below with reference to the figures, but the protection scope of the present invention is not limited to the following descriptions.

Figure 1:
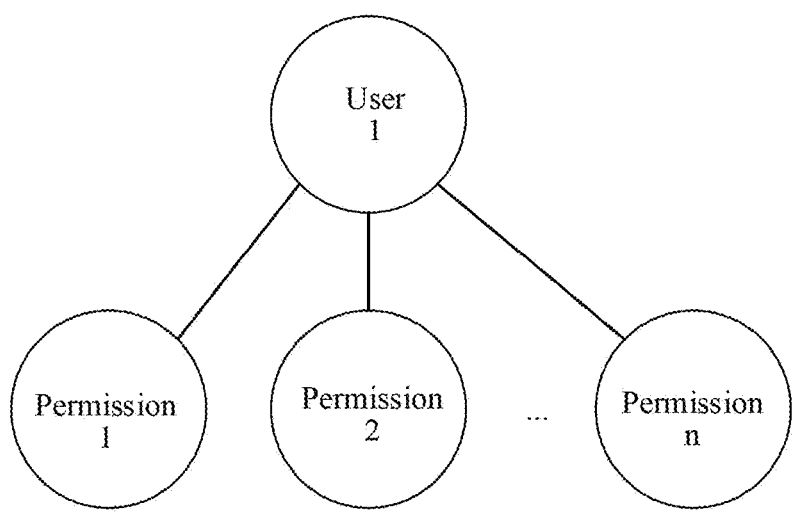
FIG. 1 is a schematic diagram in which a system directly authorizes a user in the prior art.
Figure 2:
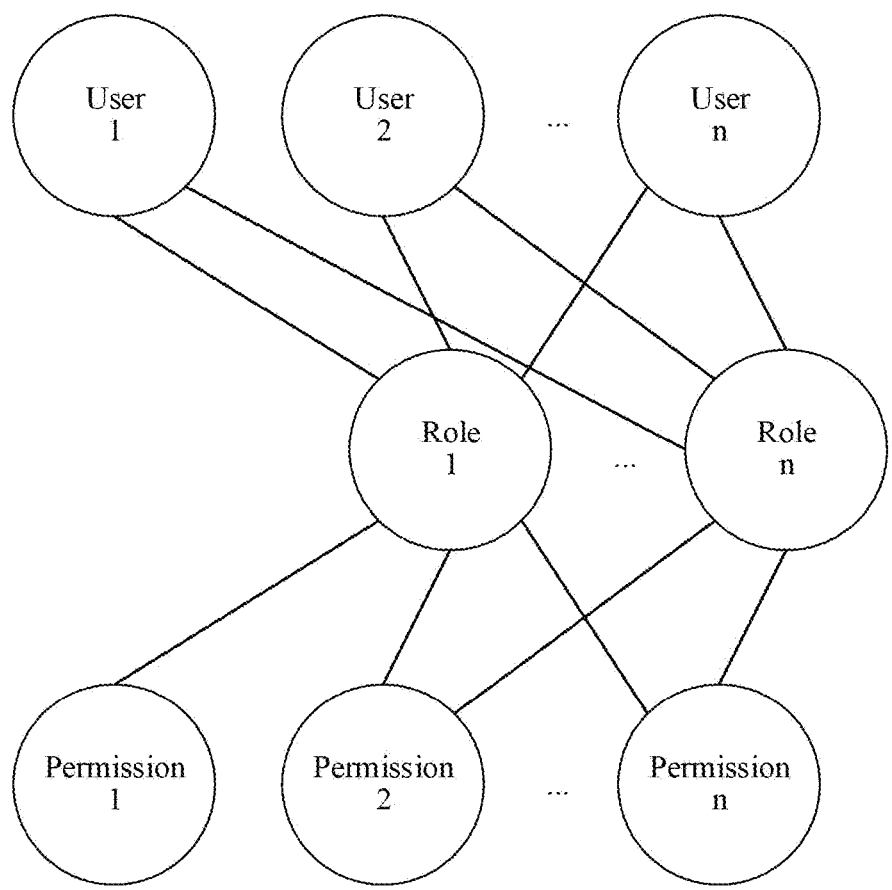
FIG. 2 is a schematic diagram in which a system authorizes a role having the nature of a group/a class in the prior art.
Figure 3:
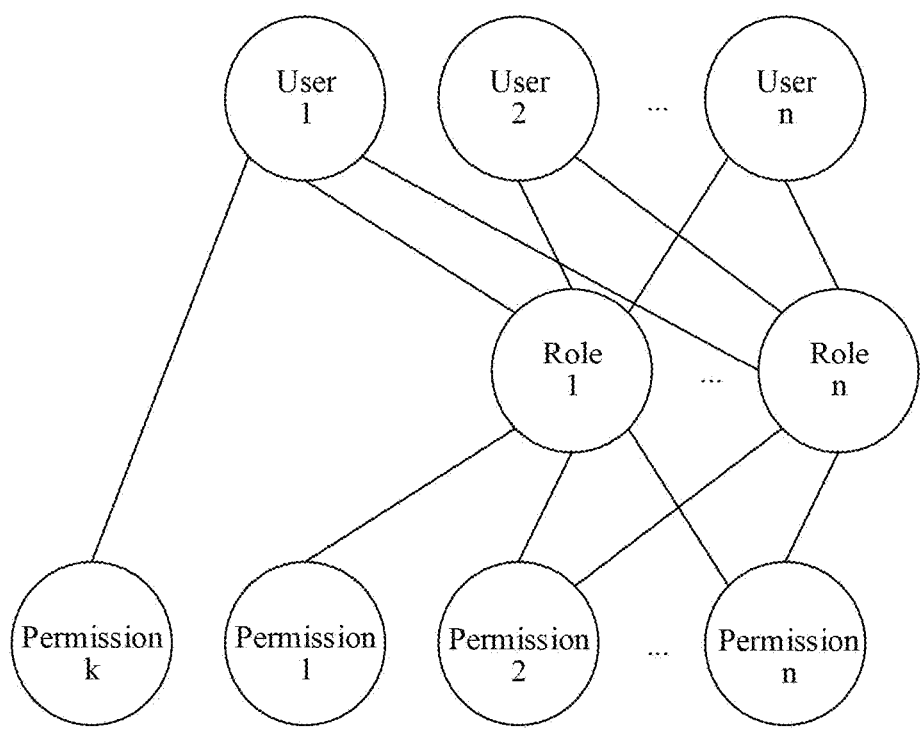
FIG. 3 is a schematic diagram in which a system both directly authorizes a user and a role having the nature of a group/a class in the prior art.
Figure 4:
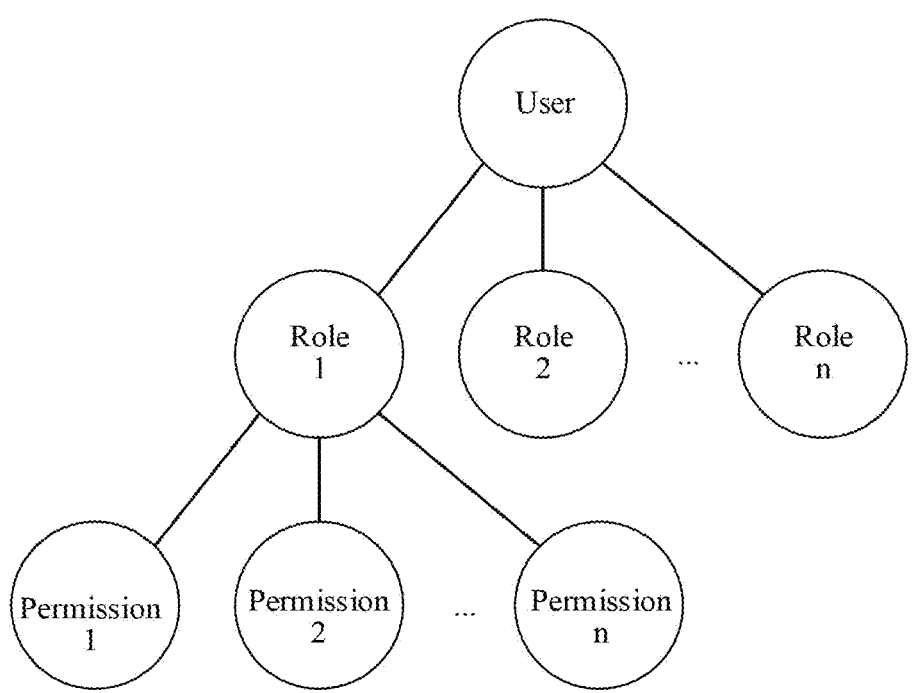
FIG. 4 is a schematic diagram in which a system authorizes a user through a role having the nature of an independent individual according to the present invention.
Figure 5:
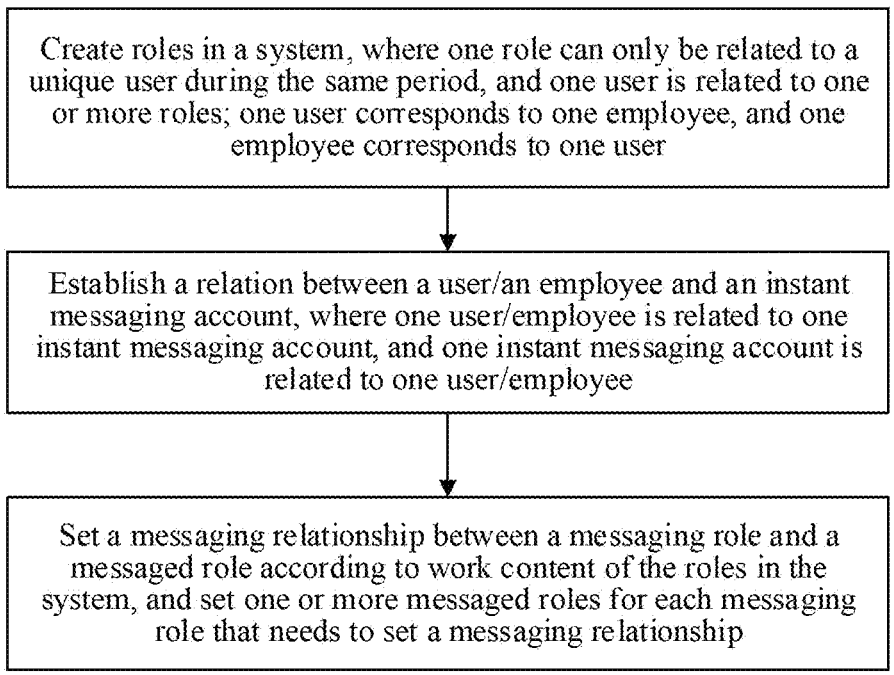
FIG. 5 is a flowchart of a method in Embodiment 1 of the present invention.

[Embodiment 1] As shown in FIG. 5, a method for presetting contacts of an instant messaging account according to a messaging relationship between roles includes the following steps: creating roles in a system, wherein as shown in FIG. 4, the role is an independent individual not a group/a class, and during the same period, one role can only be related to a unique user, and one user is related to one or more roles; one user corresponds to one employee, and one employee corresponds to one user. The employee determines (obtains) permissions through the role related to the user corresponding to the employee. The employee and the user are in a one-to-one relation with each other and are permanently bound. After a user corresponds to an employee, the user belongs to the employee, and the user can no longer be related to other employees; if the employee resigns, the user cannot correspond to other employees either. After the employee is recruited again, the employee still uses the original user.

A relation between a user/an employee and an instant messaging account is established, wherein one user/employee is related to one instant messaging account, and one instant messaging account is related to one user/employee. After an employee/a user resigns, the instant messaging account related to the user/employee will be suspended, and the instant messaging account will not be assigned to other employees/users, which ensures that communication message content in the instant messaging account will not be leaked, but a higher-level supervisor of the employee, if authorized, can still operate the instant messaging account. If the employee is re-recruited to the company after resignation, the original instant messaging account of the employee is automatically used by the employee and/or the user corresponding to the employee again (once being related to the user or the employee, the instant messaging account is constantly in a related state and cannot be changed).

A messaging relationship between a messaging role and a messaged role is set according to the work content of the roles in the system, wherein the messaging role and the messaged role are both the roles in the system, and one or more messaged roles are set for each messaging role for which a messaging relationship is set, so that: a messaging relationship is established between an instant messaging account related to a user who is related to the messaging role or an employee corresponding to the user and an instant messaging account related to a user who is related to the messaged role or an employee corresponding to the user, and the instant messaging account related to the user who is related to the messaged role or the employee corresponding to the user is used as a contact of the instant messaging account related to the user who is related to the messaging role or the employee corresponding to the user.

The contact may be a "friend" having the nature of an individual in the instant messaging account, or may be a "group" having the nature of a group in the instant messaging account. When a group on the instant messaging account is preset for the user/employee, a method the same as the present application may also be used.

In the present invention, a messaging relationship between roles is set according to the work content of the roles in the system, and contacts related to an employee's work are preset for an instant messaging account related to the employee, so that the employee can achieve quick and effective communication through the instant messaging account, thus reducing the employee's workloads for adding contacts, and also solving the problem of being easily disturbed due to excessive irrelevant contacts.

On the contrary, when the original messaged role is selected as a messaging role to set the contacts of the instant messaging account, the original messaging role becomes its messaged role, and in this case, the instant messaging account related to the user who is related to the original messaging role or the employee corresponding to the user cannot be deleted from the contacts of the instant messaging account related to the user who is related to the original messaged role or the employee corresponding to the user, and if deletion is needed, the instant messaging account can only be deleted when the contacts of the instant messaging account of the original messaging role are set.

For example, the original messaging role is A, and the instant messaging account related to the user who is related to the role A is Q1. The original messaged role is B, and the instant messaging account related to the user who is related to the role B is Q2. The messaged role B is set for, the messaging role A, and then contact friends of Q1 include Q2. When the role B is selected as a messaging role and a messaged role is set for B, the role A automatically becomes the messaged role of B, and then friends of Q2 include Q1. In this case, Q1 cannot be deleted from the contacts of Q2. If deletion is needed, Q1 can only be deleted when the contacts of the instant messaging account of the role A are set (that is, the role B is not set to have a messaging relationship with the role A, or the role B is not set as the messaged role of the role A).

In this embodiment, after an instant messaging account is related to a user/an employee, the instant messaging account related to the user/employee cannot be changed; or after an instant messaging account is related to a user/an employee and the instant messaging account is used, the instant messaging account related to the user/employee cannot be changed.

When an instant messaging account is related to a user, the instant messaging account related to the user is used as an instant messaging account of an employee corresponding to the user; and when an instant messaging account is related to an employee, the instant messaging account related to the employee is used as an instant messaging account of a user corresponding to the employee.

In addition to the instant messaging account preset by the system for the employee/user, the employee/user can also add the contacts of the messaging account by himself/herself (that is, add other instant messaging accounts as friends), but needs an agreement from the opposing party while adding them (if the account of the added party has set "being added without agreement", the account is successively added automatically).

Figure 6:
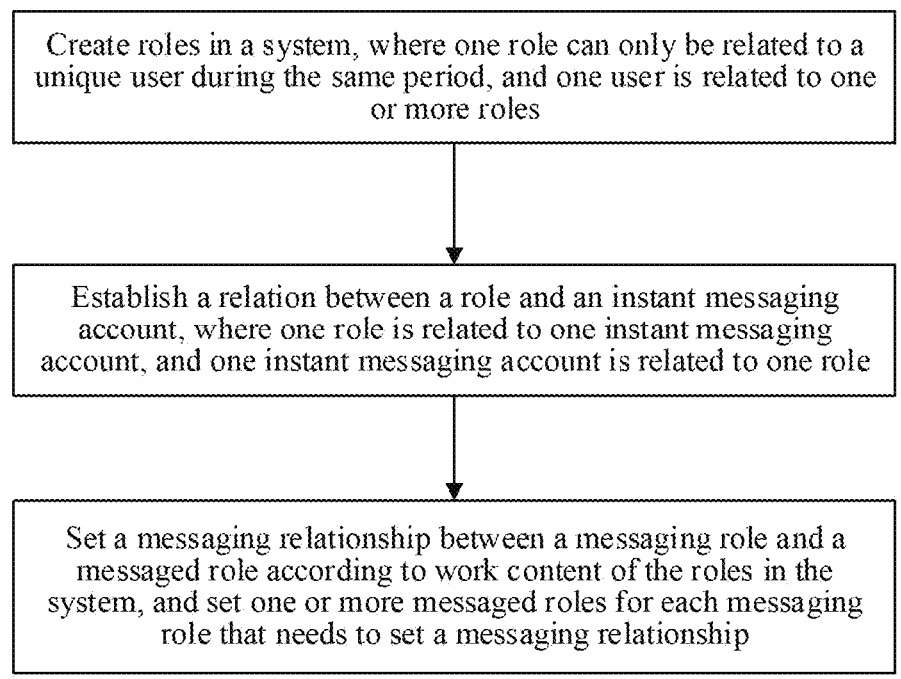
FIG. 6 is a flowchart of a method in Embodiment 2 of the present invention.

[Embodiment 2] As shown in FIG. 6, a method for presetting contacts of an instant messaging account according to a messaging relationship between roles includes the following steps: creating roles in a system, wherein the role is an independent individual not a group/a class, and during the same period, one role can only be related to a unique user, while one user is related to one or more roles; establishing a relation between a role and an instant messaging account, wherein one role is related to one instant messaging account, and one instant messaging account is related to one role; and relating an instant messaging account to a role according to the work content of the role in the system. Furthermore, the instant messaging account is an instant messaging account having the nature of a post number/a station number.

A messaging relationship between a messaging role and a messaged role is set according to the work content of the roles in the system, wherein the messaging role and the messaged role are both the roles in the system, and one or more messaged roles are set for each messaging role for which a messaging relationship needs to be set, so that a messaging relationship is established between an instant messaging account related to the messaging role and an instant messaging account related to the messaged role, and the instant messaging account related to the messaged role is used as a contact of the instant messaging account related to the messaging role. The employee can also add or delete contacts (including friends/groups) by himself/herself based on the contacts (such as QQ friends) of the preset instant messaging account, but needs an agreement from a third party or the opposing party (if the third party/the opposing party has the setting of "being added without agreement", the contact is successively added automatically).

In this embodiment, an instant messaging account is bound to each role (the role and the instant messaging account are bound permanently and cannot be changed, and after the role is out of service, the corresponding instant messaging account cannot be related to other roles. When the role is put into use, the role still uses the originally related instant messaging account), and a corresponding instant messaging account is assigned to an employee when a post number or work is assigned to the employee. It is unnecessary to separately assign the instant messaging account to the employee. The employee obtains the instant messaging account through the role related to the corresponding user. When the employee resigns, a system administrator (or a corresponding administrator) directly cancels the relation between the user corresponding to the employee and the role, and then the resigned employee automatically loses the permission to use the instant messaging account, thus avoiding the risk of leaking confidential information of the enterprise. When the employee is transferred from a post, the system administrator (or the corresponding administrator) directly cancels the employee's relation to the original role, and then relates the employee to a new role, and then the employee can automatically obtain the instant messaging account corresponding to the new role, thus achieving seamless handover and ensuring that the instant messaging account used by the user is updated in time. No hysteresis or omission occurs during the handover of the messaging account, without affecting the employee to use the messaging account normally, and the risk of leaking confidential information is also avoided.

Example of resignation: An instant messaging account related to a role "production worker 1" is a QQ number 123456, and when a user corresponding to an employee Zhang San is related to the "production worker 1", Zhang San uses the QQ number 123456. When Zhang San resigns, a system administrator (or a corresponding administrator) directly cancels the relation between the user corresponding to Zhang San and the role "production worker 1", and then Zhang San automatically loses the permission to use the QQ number 123456, thus preventing the related confidential information of the "production worker 1" from being leaked to Zhang San due to the delay of the QQ number handover. When a newly recruited employee Li Si takes over Zhang San's work, the user corresponding to Li Si is directly related to the "production worker 1". Then, Li Si automatically obtains the permission to use the QQ number 123456 corresponding to the role "production worker 1", and it is unnecessary to assign a new QQ to Li Si. The operation is simple and convenient, thus greatly reducing the workloads. Moreover, Li Si, who takes over the work, can view Zhang San's previous message records with contacts in the QQ number, thus achieving a good handover effect, which helps to carry out the work and makes usage convenient.

Example of transfer: The employee Zhang San needs to be transferred from a production department to an after-sales department; the system administrator (or the corresponding administrator) cancels the relation between the user corresponding to Zhang San and the original role "production worker 1", and then relates the user to a new role "after-sales personnel 3" in the after-sales department. Then, Zhang San automatically obtains the permission to use a QQ number 987654 corresponding to the role "after-sales personnel 3".

After an employee is transferred from, a post or resigns, when the instant messaging account related to the role is assigned to another employee, the instant messaging account will not be assigned to an employee who is not responsible for the work content of the role. Because the role in the present invention is a role having the nature of a post number/a station number, this ensures that communication messages will not be leaked to irrelevant personnel in a process of changing the user of the instant messaging account.

For example, a user corresponding to an employee A is related to two roles: an electrical appliance salesperson 1 and a software salesperson 1. As the employee A resigns, the electrical appliance salesperson 1 is related to a user corresponding to an employee B (the employee B obtains an instant messaging account related to the electrical appliance salesperson 1), and the software salesperson 1 is related to a user corresponding to an employee C (the employee C obtains an instant messaging account related to the software salesperson 1). In this case, the employee B can only obtain information related to electrical appliance sales through a messaging account corresponding to the "electrical appliance salesperson 1", but cannot access information related to software sales. Similarly, the employee C can only obtain information related to software sales through the messaging account corresponding to the "software, salesperson 1", but cannot access information related to electrical appliance sales.

In this embodiment, an instant messaging account is related to a role according to the work content. When sending a message, a contact of the messaging account does not need to worry that the message content is visible to irrelevant personnel, because the current user of the instant messaging account is definitely responsible for the related work now. For example, the work content of a role A is to conduct attendance statistics, and the role A is related to an instant messaging account X. In this case, after the role A is related to a user corresponding to an employee A, the employee A becomes the current user of the instant messaging account X, while the current work content of the employee A definitely includes conducting attendance statistics. After a contact of the instant messaging account X sends an attendance-related message to the instant messaging account X, the attendance-related message will be invisible to irrelevant personnel.

[Embodiment 3] Based on Embodiment 2, in this embodiment, after an instant messaging account is related to a role, the instant messaging account related to the role cannot be changed; or after an instant messaging account is related to a role and the instant messaging account is used, the instant messaging account related to the role cannot be changed. That is, the role and the instant messaging account are related permanently. If the role is not used, the corresponding instant messaging account cannot be related to other roles. After the role is put into use again, the role still uses the originally related instant messaging account.

After an instant messaging account is related to a role, the instant messaging account related to the role cannot be changed, so that all messages related to the work content of the role are collected in the messaging account, and it is unnecessary to worry that the instant messaging account is changed halfway.

For example, if a role A is related to an instant messaging account X, the role A can no longer be related to other instant messaging accounts, and the instant messaging account X can no longer be related to other roles either.

In another situation, when the instant messaging account needs to be changed for a role, the role's relation to the original instant messaging account is canceled, and the role is related to a new instant messaging account.

In this embodiment, the instant messaging account is an account of an instant messaging application in the system (an instant messaging account in the system) or an account of instant messaging software provided by a third party (for example, a qq number, or a WeChat number).

Figure 7:
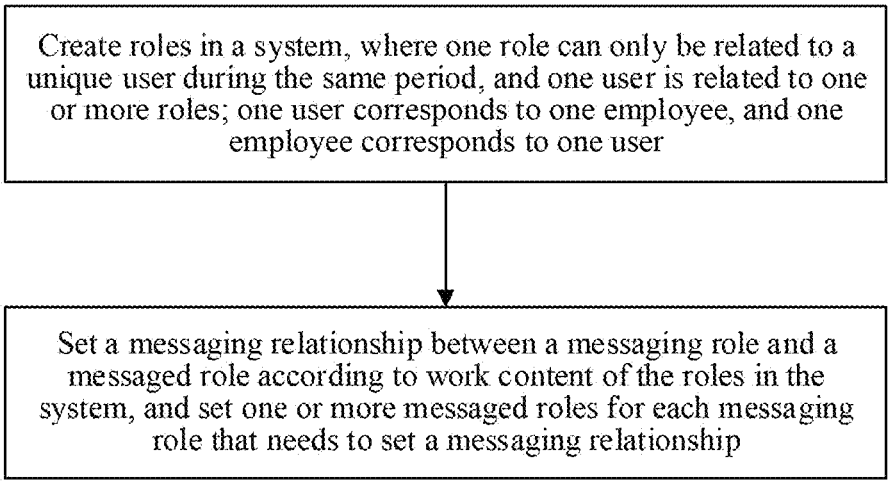
FIG. 7 is a flowchart of a method in Embodiment 4 of the present invention.

[Embodiment 4] As shown in FIG. 7, a method for presetting an address book according to a messaging relationship between roles includes the following steps: creating roles in a system, wherein the role is an independent individual not a group/a class, and during the same period, one role can only be related to a unique user, and one user is related to one or more roles; one user corresponds to one employee, and one employee corresponds to one user; and setting a messaging relationship between a messaging role and a messaged role according to the work content of the roles in the system, wherein the messaging role and the messaged role are both the roles in the system, and one or more messaged roles are set for each messaging role for which a messaging relationship needs to be set, so that a messaging relationship is established between an employee corresponding to a user related to the messaging role and an employee corresponding to a user related to the messaged role, and communication information of the employee corresponding to the user related to the messaged role forms an address book of the employee corresponding to the user related to the messaging role. The communication information includes one or more types of the name, gender, department, post, position, phone number, QQ, mailbox, address, and the like of each employee.

Further, when the messaging role and the messaged role are set, it is further set that the user corresponding to the messaging role/the employee corresponding to the user can only see some or all pieces of information in the communication information of the employee corresponding to the user that corresponds to the messaged role. For example, the user corresponding to the messaging role corresponds to an employee A, and the users corresponding to the messaged roles correspond to employees B, C, and D. After the corresponding settings, the result may be as follows: the employee A can see the employee B's name and mailbox, can see the employee C's name, mailbox and phone number, and can see all communication information of the employee C in the address book. After the user related to the messaging role/messaged role has changed, the employee corresponding to the user corresponding to the role is also controlled by this permission, because the permission is set on the role (the purpose of such setting is that the contact means of the senior executives or sensitive employees can be made public, while some sensitive contact means can also be hidden, for example, the chairman's mobile phone number, thus avoiding being disturbed).

In addition to the address book preset by the system for the employee, the employee can also add communication information of other employees (other persons who are not employees/not in the system can also be added) into his/her address book by himself/herself, but (other persons who are not employees/not in the system can also be added) needs an agreement from a third party or an opposing party. For example, an employee A wants to add an employee C to the address book, and then clicks an address book adding function in the system. A list of all employees who are not in the address book pops up (or an object to be added is displayed by means of query), and the employee A can click to select the employ C. In this case, the request of adding communication information to the address book will be sent to the third-party (higher-level supervisor) or the employee C, and the adding can succeed only after the third party or the employee confirms the agreement.

In this embodiment, a messaging relationship between roles is set according to the work content of the roles in the system, and an address book composed of communication information of employees related to an employee's work is preset for the employee, so that the employee can quickly find, through the address book, communication information of an employee to be contacted.

When the employee corresponding to the user related to the messaged role corresponds to multiple roles related to the user, the communication information of the employee is not displayed repeatedly in the address book of the employee corresponding to the user related to the messaging role. For example, roles related to the user corresponding to the employee Zhang San include a production worker 1 and an after-sales engineer 3, and communication messages/ information of the employee Zhang San is displayed only once in the address book of the employee corresponding to the user related to the messaging role (or is not displayed repeatedly, because when the production worker 1 and the after-sales engineer 3 are used as messaged roles of the same messaging role, the communication information of Zhang San corresponding to them is the same.)

In the foregoing embodiment, a department needs to be selected for the role. Once the department is selected for the role, the role belongs to the department. The name of the role is unique under the department, the number of the role is unique in the system, and the role is authorized according to the work content of the role. As shown in FIG. 4, the role having the nature of an independent individual is used in the present application. In the following, the advantages of the method for authorizing the user by using the role having the nature of an independent individual are analyzed: The user determines (obtains) permissions through its relation to the role. If the permissions of the user need to be modified, the permissions owned by the role are adjusted to achieve the purpose of changing the permissions of the user related to the role. Once the user is related to the role, the user owns all the operation permissions of the role.

The role is in a one-to-one relation to a user (when the role is related to one user, other users can no longer be related to that role; and if the role is not related to the user, the role can be selected to be related to other users; that is, during the same period, one role can only be related to one user). A user is in a one-to-many relation to roles (one user can be related to multiple roles at the same time).

Definition of a role: A role does not have the nature of a group/a class/a category/a post/a position/a type of work or the like, but has non-collective nature. The role is unique and is an independent individual. Applied in an enterprise or an institution, the role is equivalent to a post number (the post number herein is not a post, and one post may have multiple employees at the same time, but one post number can only correspond to one employee during the same period).

For example, in a company system, the following roles may be created: a general manager, a deputy general manager 1, a deputy general manager 2, a manager of Beijing sales department I, a manager of Beijing sales department II, a manager of Beijing sales department III, a Shanghai sales engineer 1, a Shanghai sales engineer 2, a Shanghai sales engineer 3, a Shanghai sales engineer 4, a Shanghai sales engineer 5, and so on. The relation between users and roles is as follows: if Zhang San, the company's employee, serves as a deputy general manager 2 of the company and also serves as a manager of Beijing sales department I, the roles to which Zhang San needs to be related are the deputy general manager 2 and the manager of Beijing sales department I, and Zhang San owns the permissions of the two roles.

The concept of conventional roles is a group/a class/a post/a position/a type of work in nature, and one role can correspond to multiple users. However, in the present application, the concept of "role" is equivalent to a post number/a station number, and is also similar to the role in a film and television drama: one role (in childhood, juvenile, middle-age . . . ) can be played by only one actor or actress during the same period, but one actor or actress may play multiple roles.

After the role is created, a user may be related to the role in the process of creating the user, or may be related to the role at any time after the user is created. After the user is related to the role, the user can be released from the relation to the role at any time, and the relation between the user and another role may be created at any time.

The role is composed of: a post name+a post number, for example, a workshop worker 1, a workshop worker 2, a workshop worker 3, and so on. The role is an independent individual, and is equivalent to the concept of a post number or a station number, but different from the role in a conventional permission management system. The concept of the role in the conventional system has the nature of a group/a class such as a post/a position/a type of work or the like.

The following example shows the relationship among an employee, a user, and a role after Zhang San, an employee, entered a company as follows: 1. Recruiting: after the employee is recruited, the role of the corresponding post number/station number is directly selected for the user (employee) to be related. For example, when Zhang San has joined the company (the company has assigned a user Zhang San for Zhang San) and works at the sales department I to be responsible for selling refrigerator products in Beijing area (the corresponding role is "sales engineer 5" under the sales department I), then the user Zhang San directly selects and is related to the role "sales engineer 5".

2. Adding position: After Zhang San has worked for a period of time, the company further arranges Zhang San to be responsible for selling TV products in Beijing area (the corresponding role is "sales engineer 8" under the sales department I) and to serve as the supervisor of an after-sales department (the corresponding role is "after-sales supervisor 1"). Therefore, two roles, that is, "sales engineer 8" under the sales department I and "after-sales supervisor 1" under the after-sales department, are additionally related to the user Zhang San. In this case, the employee Zhang San is related to three roles: "sales engineer 5" and "sales engineer 8" under the sales department I, and "after-sales supervisor 1" under the after-sales department. Therefore, the user Zhang San owns the permissions of the three roles.

3. Reducing position: After a while, the company has decided to let Zhang San serve as an after-sales manager (corresponding to a role "after-sales manager" under the after-sales department) without taking up other positions. Therefore, the user Zhang San is related to the role "after-sales manager" under the after-sales department, and is released from the relation to the previous three roles ("sales engineer 5" and "sales engineer 8" under the sales department I, and "after-sales supervisor 1" under the sales department). In this case, the user Zhang San owns only the permissions of the role "after-sales manager" under the after-sales department.

4. Adjusting permissions of a role (adjusting the permissions of the role itself): if the company has decided to add permissions to the after-sales manager, the permissions only need to be added to the role of the after-sales manager. With the increase of the permissions of the role of the after-sales manager, the permissions of the user Zhang San are also increased.

5. Resignation: After one year, Zhang San resigns. It is only necessary to cancel the relation between the user Zhang San and the role "after-sales manager" under the after-sales department.

For example, during the dynamic operation of the company, recruiting and resigning of staff often occur continuously, but post numbers/station numbers seldom change (or even remain unchanged within a period of time).

The conventional authorization method: In the case of a large quantity of system function points, authorizing the conventional roles that have the nature of a group/a class involves a large and cumbersome workload and is very error-prone, and errors are not easily detectable in a short time and tend to cause loss to a system user.

The authorization method of the present application: in the present application, the role having the nature of a post number/a station number is authorized, and the user is related to the role to determine (obtain) permissions. Therefore, the permissions of the user are controlled by only a simple user-role relation. Controlling the permissions is simple, easily operable, clear, and explicit, thereby significantly improving the efficiency and reliability of authorization.

The above is only a preferred embodiment of the present invention, and it should be understood that the present invention is not limited to the forms disclosed herein, and is not to be construed as being limited to the other embodiments, but may be used in various other combinations, modifications and environments. Modification can be made by the techniques or knowledge of the above teachings or related art within the scope of the teachings herein. All changes and modifications made by those skilled in the art without departing from the spirit and scope of the present invention are intended to be within the protection scope of the appended claims.

What is claimed is:

1. A method for presetting contacts of an instant messaging account according to a messaging relationship between roles, comprising the followings steps:

creating a plurality of roles in a system, wherein each role of the plurality of roles is an independent individual which is not a group or a class, and during a same period, each role of the plurality of roles is configured to be related to a user only, and the user is configured to be related to one or more roles of the plurality of roles; wherein one user is configured to correspond to one employee, and one employee is configured to correspond to one user;

establishing a relation between the user and an instant messaging account, wherein the user is configured to be related to the instant messaging account, and the instant messaging account is configured to be related to the user; and setting a messaging relationship between a messaging role and a messaged role according to work content of the plurality of roles in the system, wherein the messaging role and the messaged role are both the roles of the plurality of roles in the system, comprising setting one or more messaged roles for the messaging role for which a messaging relationship needs to be set, so that a messaging relationship is established between an instant messaging account related to a user who is related to the messaging role and an instant messaging account related to a user who is related to the messaged role of the one or more messaged roles, and the instant messaging account related to the user who is related to the messaged role is configured to be used as a contact of the instant messaging account related to the user who is related to the messaging role.

2. The method for presetting contacts of an instant messaging account according to a messaging relationship between roles according to claim 1, wherein when the original messaged role is selected as a messaging role to set contacts of the instant messaging account, the original messaging role is configured to become its messaged role, the instant messaging account related to the user who is related to the original messaging role cannot be deleted from contacts of the instant messaging account related to the user who is related to the original messaged role, and in a case deletion is needed, the instant messaging account can only be deleted when the contacts of the instant messaging account of the original messaging role are set.

3. The method for presetting contacts of an instant messaging account according to a messaging relationship between roles according to claim 1, wherein after an instant messaging account is configured to be related to a user, the instant messaging account related to the user cannot be changed; or
after an instant messaging account is configured to be related to a user and the instant messaging account is used, the instant messaging account related to the user cannot be changed.

4. The method for presetting contacts of an instant messaging account according to a messaging relationship between roles according to claim 1, wherein when an instant messaging account is configured to be related to a user, the instant messaging account related to the user is used as an instant messaging account of an employee corresponding to the user; and
when an instant messaging account is configured to be related to an employee, the instant messaging account related to the employee is used as an instant messaging account of a user corresponding to the employee.

5. A method for presetting contacts of an instant messaging account according to a messaging relationship between roles, comprising the following steps:
creating a plurality of roles in a system, wherein each role of the plurality of roles is an independent individual which is not a group or a class, and during a same period, each role of the plurality of roles is configured to be related to a user only, and the user is configured to be related to one or more roles of the plurality of roles;
establishing a relation between a role and an instant messaging account, wherein one role is configured to be related to one instant messaging account, and one instant messaging account is configured to be related to one role; and
setting a messaging relationship between a messaging role and a messaged role according to work content of the plurality of roles in the system, wherein the messaging role and the messaged role are both the roles of the plurality of roles in the system; comprising setting one or more messaged roles for the messaging role for which a messaging relationship needs to be set, so that a messaging relationship is established between an instant messaging account related to the messaging role and an instant messaging account related to the messaged role of the one or more messaged roles, and the instant messaging account related to the messaged role of the one or more messaged roles is used as a contact of the instant messaging account related to the messaging role.

6. The method for presetting contacts of an instant messaging account according to a messaging relationship between roles according to claim 5, wherein after an instant messaging account is configured to be related to a role, the instant messaging account related to the role cannot be changed; or
after an instant messaging account is configured to be related to a role and the instant messaging account is used, the instant messaging account related to the role cannot be changed.

7. The method for presetting contacts of an instant messaging account according to a messaging relationship between roles according to claim 5, wherein when the instant messaging account needs to be changed for a role, the role's relation to an original instant messaging account is configured to be canceled, and the role is configured to be related to a new instant messaging account.

8. The method for presetting contacts of an instant messaging account according to a messaging relationship between roles according to claim 5, wherein said instant messaging account is an account of an instant messaging application in the system or an account of instant messaging software provided by a third party.

9. A method for presetting an address book according to a messaging relationship between roles, comprising the following steps:
creating a plurality of roles in a system, wherein each role of the plurality of roles is an independent individual which is not a group or a class, and during a same period, each role of the plurality of roles is configured be related to a user only, and the user is related to one or more roles of the plurality of roles; wherein one user is configured to correspond to one employee, and one employee is configured to correspond to one user; and
setting a messaging relationship between a messaging role and a messaged role according to work content of the plurality of roles in the system, wherein the messaging role and the messaged role are both the roles of the plurality of roles in the system, comprising setting one or more messaged roles for each messaging role for which a messaging relationship needs to be set, so that a messaging relationship is established between an employee corresponding to a user related to the messaging role and an employee corresponding to a user related to the messaged role of the one or more messaged roles, and communication information of the employee corresponding to the user related to the messaged role of the one or more messaged roles is configured to form an address book of the employee corresponding to the user related to the messaging role.

10. The method for presetting an address book according to a messaging relationship between roles according to claim 9, wherein when the employee corresponding to the user related to the messaged role is configured to correspond to multiple roles related to the user, the communication information of the employee is not displayed repeatedly in the address book of the employee corresponding to the user related to the messaging role.

* * * * *